(12) United States Patent
Kojima et al.

(10) Patent No.: US 12,508,888 B2
(45) Date of Patent: Dec. 30, 2025

(54) SEALING STRUCTURE FOR DOOR OF AUTOMOBILE

(71) Applicant: NISHIKAWA RUBBER CO., LTD., Hiroshima (JP)

(72) Inventors: Masahiro Kojima, Hiroshima (JP); Yasuhiro Morihara, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 387 days.

(21) Appl. No.: 18/037,542

(22) PCT Filed: Jun. 18, 2021

(86) PCT No.: PCT/JP2021/023167
§ 371 (c)(1),
(2) Date: May 17, 2023

(87) PCT Pub. No.: WO2022/107374
PCT Pub. Date: May 27, 2022

(65) Prior Publication Data
US 2024/0001746 A1   Jan. 4, 2024

(30) Foreign Application Priority Data

Nov. 18, 2020  (JP) ................. 2020-192102

(51) Int. Cl.
*B60J 10/88*   (2016.01)
*B60J 10/40*   (2016.01)
*B60J 10/76*   (2016.01)

(52) U.S. Cl.
CPC ............... *B60J 10/88* (2016.02); *B60J 10/40* (2016.02); *B60J 10/76* (2016.02)

(58) Field of Classification Search
CPC ....................................................... B60J 10/88
See application file for complete search history.

(56) References Cited

U.S. PATENT DOCUMENTS 4,608,779 A * 9/1986 Maeda ................ B60J 10/32
49/440
4,989,369 A * 2/1991 Maass ................ B60J 10/79
49/477.1

(Continued)

FOREIGN PATENT DOCUMENTS

CN       204774509 U      11/2015
DE   102012000704 A1 *   7/2013   ............. B60J 10/88

(Continued)

OTHER PUBLICATIONS

International Search Report (ISR) (and an English language translation thereof) dated Aug. 24, 2021, issued in International Application No. PCT/JP2021/023167.
Written Opinion dated Aug. 24, 2021, issued in International Application No. PCT/JP2021/023167.

*Primary Examiner* — Catherine A Kelly
(74) *Attorney, Agent, or Firm* — Holtz, Holtz & Volek PC (57) ABSTRACT

A length of a sub seal of a door weather strip is sized and dimensioned in a manner that a distance is longer than a length with a glass run coupling to an outer-cabin side of a flange of a frame and the door weather strip coupling to an inner-cabin side of a door with a clip. The distance is between part of a lower part of a top end of the sub seal of the door weather strip in contact with an inclined surface of an upper side wall of the glass run and part of an upper surface of a top end of a lip of the glass run. The length is of a perpendicular line that extends between the sub seal and an inclined plate of the frame passing through the part of the upper surface of the top end of the lip.

7 Claims, 9 Drawing Sheets

(56) References Cited

U.S. PATENT DOCUMENTS

| | | | |
|---|---|---|---|
| 5,038,521 A * | 8/1991 | Andrzejewski | B60J 10/79 |
| | | | 49/495.1 |
| 5,806,247 A * | 9/1998 | Yamamoto | B60J 10/76 |
| | | | 49/495.1 |
| 6,039,384 A * | 3/2000 | Schulte | B60J 5/0402 |
| | | | 296/146.5 |
| 6,131,342 A * | 10/2000 | Miyamoto | B60J 10/76 |
| | | | 49/489.1 |
| 7,325,859 B1 * | 2/2008 | Brancaleone | B60J 10/84 |
| | | | 49/489.1 |
| 8,458,959 B2 * | 6/2013 | Ohtake | B60J 10/86 |
| | | | 49/502 |
| 8,950,121 B2 | 2/2015 | Inaba et al. | |
| 9,931,922 B2 * | 4/2018 | Morioka | B60J 10/265 |
| 9,963,088 B2 * | 5/2018 | Yoshida | B60J 10/265 |
| 10,661,643 B1 * | 5/2020 | Warren | B60J 10/265 |
| 10,752,101 B2 * | 8/2020 | Kamitani | B60J 10/15 |
| 10,988,012 B2 * | 4/2021 | Takeda | B60J 10/27 |
| 11,535,093 B2 * | 12/2022 | Nishikawa | B60J 10/24 |
| 2007/0296238 A1 * | 12/2007 | Kinoshita | B60J 10/40 |
| | | | 296/93 |
| 2015/0273990 A1 * | 10/2015 | Adachi | B60J 10/88 |
| | | | 49/459 |
| 2019/0176602 A1 * | 6/2019 | Takeda | B60J 10/76 |
| 2020/0079298 A1 | 3/2020 | Takeda | |

FOREIGN PATENT DOCUMENTS

| | | | | |
|---|---|---|---|---|
| DE | 102014014456 A1 * | 4/2015 | | B60J 10/88 |
| DE | 102016006209 A1 * | 11/2017 | | B60J 10/88 |
| DE | 102017221012 A1 * | 5/2018 | | B60J 5/0402 |
| EP | 2803518 A2 * | 11/2014 | | B60J 10/265 |
| GB | 2429027 A * | 2/2007 | | B60J 10/18 |
| JP | H05029823 U | 4/1993 | | |
| JP | H05078623 U | 10/1993 | | |
| JP | 2555529 Y2 | 11/1997 | | |
| JP | 2005153581 A | 6/2005 | | |
| JP | 2008087501 A | 4/2008 | | |
| JP | 2012101563 A | 5/2012 | | |
| JP | 2012162100 A | 8/2012 | | |
| JP | 5139210 B2 | 11/2012 | | |
| JP | 2020037369 A | 3/2020 | | |
| JP | 2020147143 A | 9/2020 | | |

* cited by examiner

Comparative View

SEALING STRUCTURE FOR DOOR OF AUTOMOBILE

CROSS REFERENCE TO RELATED APPLICATIONS

This application is a U.S. National Stage Application of International Patent Application No. PCT/JP2021/023167, filed Jun. 18, 2021, which claims the benefit of priority under 35 U.S.C. § 119 of Japanese Patent application No. 2020-192102, filed Nov. 18, 2020, the contents of both of which are relied upon and incorporated herein by reference in their entirety.

TECHNICAL FIELD

The present invention relates to a sealing structure for a door of an automobile with a sub seal of a door weather strip making contact with a glass run, to seal a gap between the door weather strip and the glass run on the door.

BACKGROUND ART

Figure 7:
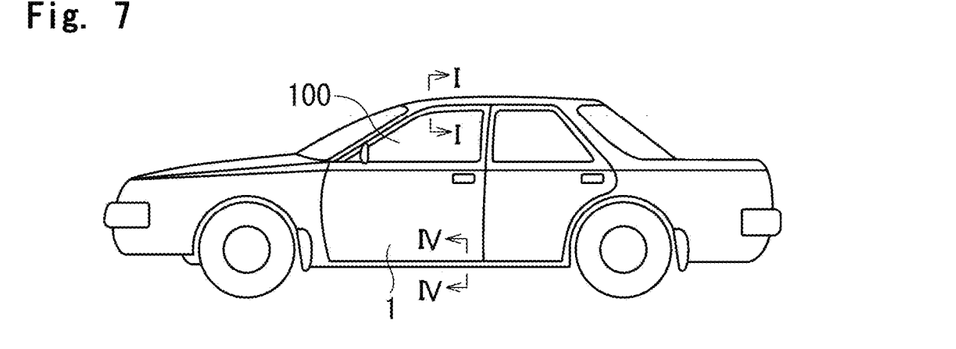
FIG. 7 is a side view of an automobile.
Figure 8:
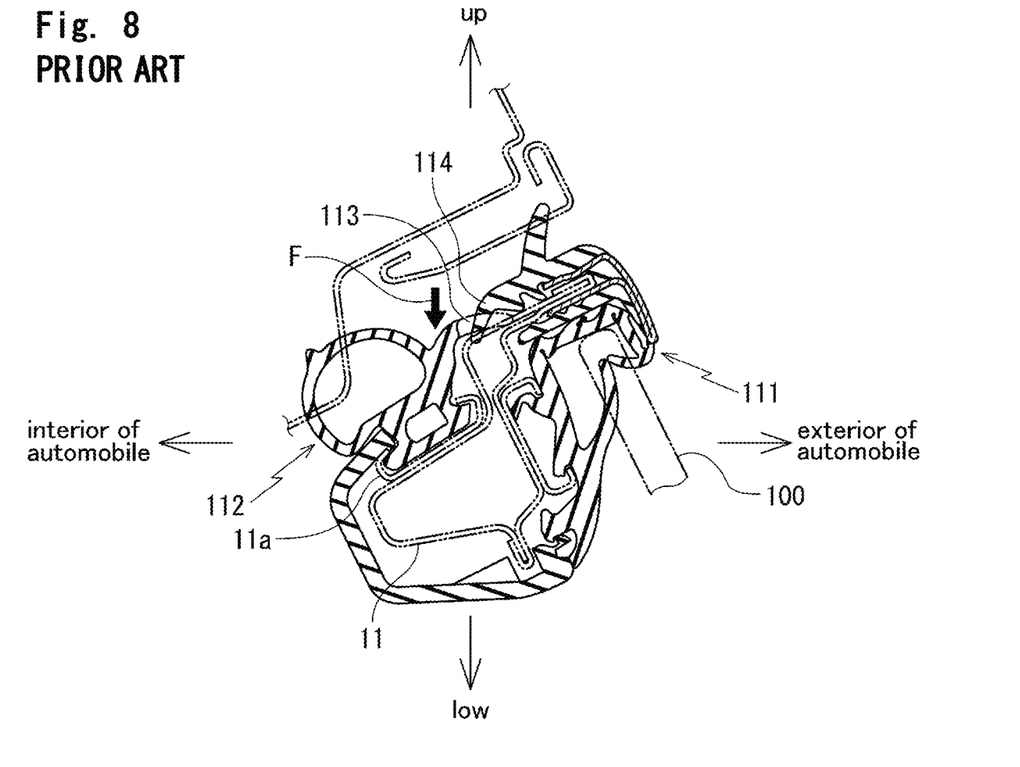
FIG. 8 is an enlarged vertical cross-sectional view of a conventional sealing structure that corresponds to line I-I of FIG. 7 for a door of an automobile.

Sealing structures illustrated in FIGS. 7 and 8 have been used commonly (see, for example, FIG. 4 of Patent document 1). A door weather strip 112 couples to an inner-cabin side of a frame 11 of a door 1 of an automobile, and a sealing member 111 couples to an outer-cabin side of the frame 11. A sub seal 113 extends from an outer-cabin side of the door weather strip 112 and makes contact with an upper surface of a lip 114, which extends from an inner-cabin side of the sealing member 111, to seal a gap between the door weather strip 112 and the sealing member 111.

The door weather strip 112 of such a structure is fixed in a retainer 11a provided on an upper surface on an inner-cabin side of the frame 11 stably. Under a downward force F applied on the sub seal 113, this configuration prevents the door weather strip 112 from moving toward an interior of the automobile and merely allows the sub seal 113 to bend downward. The pressing force F can generate with operators' hands in a coupling operation of the door weather strip 112 to the retainer 11a or with users' hands in cleaning.

Also, the sub seal 113, which is loaded onto, or overlaps, the lip 114 of the sealing member 111, would bend and would not come off the lip 114, or a top end of the sub seal 113 would not move downward toward the interior of the automobile from the upper surface of the lip 114 if a position where the door weather strip 112 couples or a length of the sub seal 113 is slightly uneven.

Figure 9:
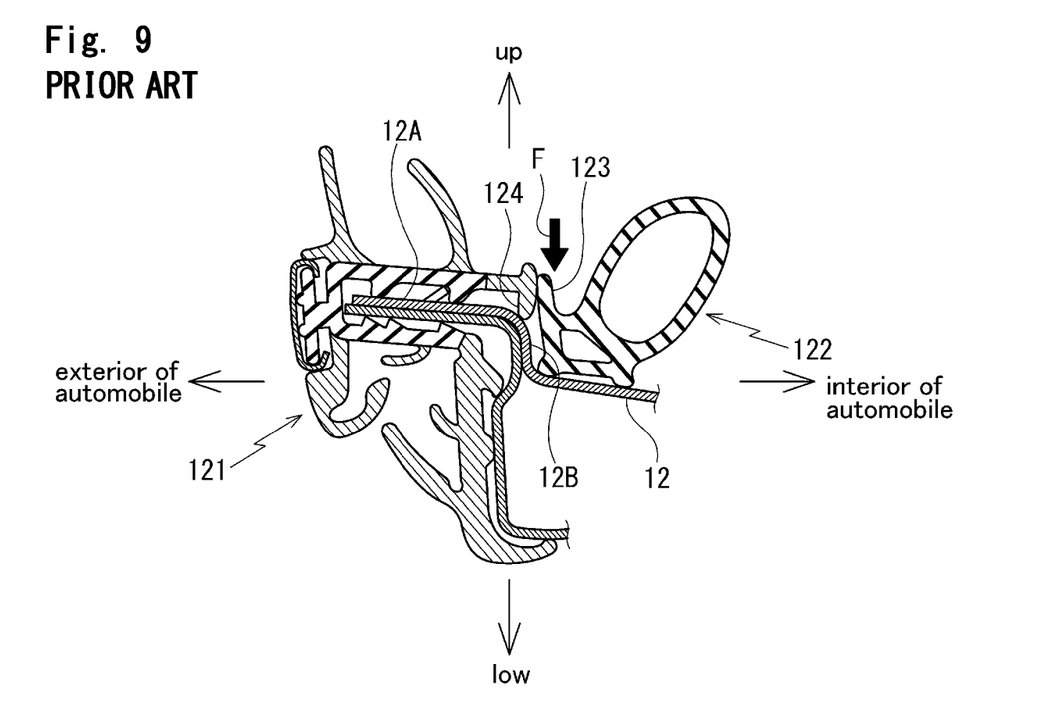
FIG. 9 is an enlarged vertical cross-sectional view of another conventional sealing structure that corresponds to line I-I of FIG. 7 for a door of an automobile.
Figure 10:
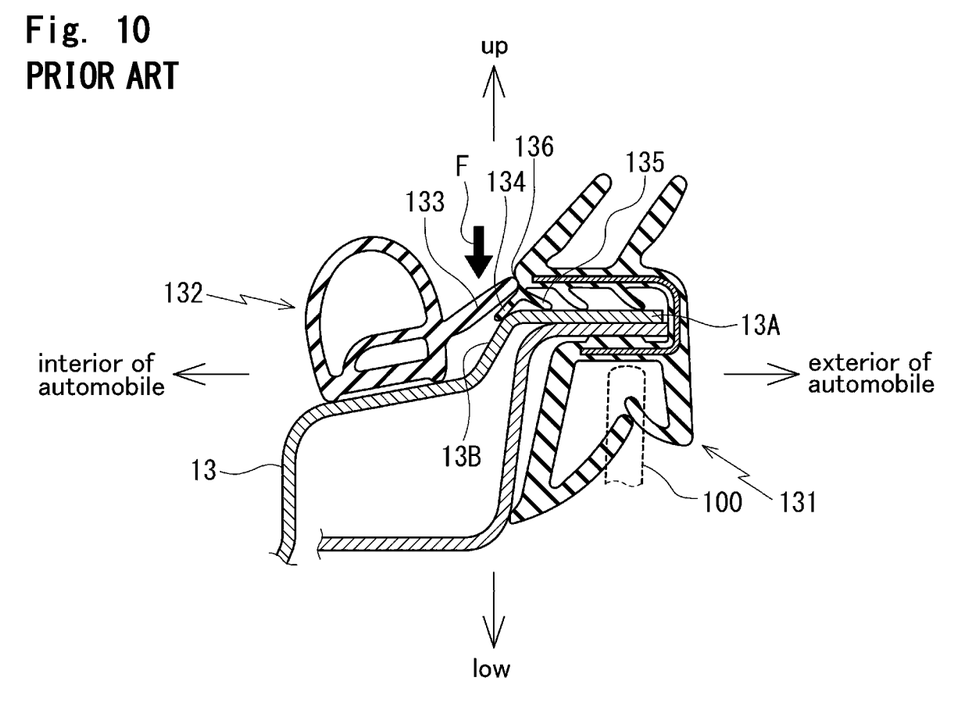
FIG. 10 is an enlarged vertical cross-sectional view of still another conventional sealing structure that corresponds to line I-I of FIG. 7 for a door of an automobile.

Sealing structures illustrated in FIGS. 9 and 10 have been used commonly as well (see, for example, FIG. 10 of Patent document 2 and FIG. 3 of Patent document 3). A door weather strip 122, 132 couples to an upper surface of a frame 12, 13 of the door 1 with a clip (illustration omitted), not a retainer. A sub seal 123, 133 of the door weather strip 122, 132 makes contact with a glass run 121, 131 of so-called "hidden type", which couples to an outer-cabin side of the frame 12, 13, to cover up part of the frame 12, 13 from the outer-cabin side of the frame 12, 13.

Under the downward force F applied on the sub seal 123, 133 of the door weather strip 122, 132, the sub seal 123, 133 moves toward the interior of the automobile due to lack of fixture between the clips. The sub seal 123, 133, therefore, is loaded onto a smaller area of the glass run 121, 131. In this connection, a length of the sub seal 123, 133 is sized and dimensioned to be loaded onto a wider area of the glass run 121, 131 in advance, and a lip 124, 134 is pressed against an inner-cabin side of an inclined plate 12B, 13B with the glass run 121, 131 coupling to the frame 12, 13. The lip 124, 134 protrudes from an inner-cabin side of the glass run 121, 131. The inclined plate 12B, 13B inclines and extends downward from an inner-cabin side of a flange 12A, 13A of the frame 12, 13.

Unfortunately, however, in pressing the lip 124, 134 against the inclined plate 12B, 13B of the frame 12, 13, the lip 124, 134 abuts with the flange 12A, 13A under a coupling operation of the glass run 121, 131 to the flange 12A, 13A. This hampers the coupling operation.

In this connection, an outer lip 135, which extends toward the exterior of the automobile, as well as the lip (inner lip) 134 has been provided, mainly to the sealing structure of FIG. 10, to improve the coupling operation. The inner lip 134 and the outer lip 135 are rotatable about an imaginary axis that extends in a front-rear direction of the automobile.

Unfortunately, however, a top end of the sub seal 133 according to the sealing structure of FIG. 10 is fit in a concave part 136 provided on an upper plate of the glass run 131, and any unevenness, e.g. a greater length of the sub seal 133 or a shorter distance between the door weather strip 132 and the glass run 131, can buckle the sub seal 133 and spoil appearance.

In addition, the inner lip 134 and the outer lip 135, which are rotatable, complicate the structure.

RELATED ART DOCUMENTS

Patent Documents

Patent document 1: Japanese Patent No. 5139210
Patent document 2: Japanese Unexamined Patent Application Publication No. 2020-37369
Patent document 3: Japanese Unexamined Patent Application Publication No. 2020-147143

DISCLOSURE OF THE INVENTION

Problems to be Solved by the Invention

To solve the above problems, it is an object of the present invention to provide a sealing structure that simplifies the coupling operation of the glass run to the frame with appearance unspoiled.

Means of Solving the Problems

To achieve the above object, an aspect of the present invention provides a sealing structure for a door 1 of an automobile. The structure includes a glass run 20, for guiding a door glass 100 in a frame 10 of the door 1, and a door weather strip 40. The frame 10 includes a flange 10A which extends toward an exterior of the automobile, an inclined plate 10B which inclines and extends downward from an inner-cabin side of the flange 10A, an inner-cabin side plate 10C which extends toward an interior of the automobile from a lower end of the inclined plate 10B, and a connecting part 10D provided between the flange 10A and the inclined plate 10B.

The glass run 20 includes an installation member 21, a main body 22, and a lip 29.

The installation member 21 couples to an outer-cabin side of the flange (10A). The installation member 21 has a substantially U-shaped cross-section, and includes an upper side wall 23, a lower side wall 24, a connecting wall 25, an anchoring part 26, and an inclined surface 23a. The connecting wall 25 connects the upper side wall 23 and the lower side wall 24. The anchoring part 26 is provided on an inner side of the installation member 21. The inclined surface 23a is provided on an inner-cabin side end of the upper side wall 23 and inclines downward toward the interior of the automobile from part of the inner-cabin side end of the upper side wall 23.

The main body 22 includes an inner-cabin side wall 27, an outer-cabin side wall 28, and the lower side wall 24. The inner-cabin side wall 27 extends downward from an inner-cabin side of the lower side wall 24. The outer-cabin side wall 28 extends downward from an outer-cabin side of the lower side wall 24. The lower side wall 24 connects the inner-cabin side wall 27 and the outer-cabin side wall 28 and forms a channel.

The lip 29 protrudes and extends downward toward the interior of the automobile from a lower part on an inner-cabin side of the upper side wall 23, and has a top end 29a. The lip 29 is flush with the inclined surface 23a.

The door weather strip 40 includes an installation base member 41, a main seal 42, and a sub seal 43. The installation base member 41 couples to an upper surface of the inner-cabin side plate 10C of the frame 10 with clips C. The main seal 42 is integrally molded with an upper side of the installation base member 41, and makes elastic contact with a body of the automobile when the door 1 is in a closed position. The sub seal 43 is integrally molded with an outer-cabin side of the installation base member 41, extends toward the exterior of the automobile, has a shape of a lip, and has a top end 43a and a base root 43b. The sub seal 43 makes contact with the upper side wall 23 of the glass run 20.

When the glass run 20 and the door weather strip 40 couple to the door 1, the top end 29a of the lip 29 is above the connecting part 10D of the frame 10 contactlessly, only a lower part of the top end 43a of the sub seal 43 of the door weather strip 40 makes contact with the inclined surface 23a of the upper side wall 23 of the glass run 20, and a length of the sub seal 43 of the door weather strip 40 is sized and dimensioned to position part P of the lower part of the top end 43a of the sub seal 43 on an upper surface of the lip 29 of the glass run 20 when the sub seal 43 touches the inclined plate 10B of the frame 10 under a downward force F applied on the sub seal 43.

In addition, according to an aspect of the present invention, the length of the sub seal 43 of the door weather strip 40 is sized and dimensioned in a manner that a distance L is longer than a distance X with the glass run 20 and the door weather strip 40 coupling to the door 1. The distance L is between the part P of the lower part of the top end 43a of the sub seal 43 of the door weather strip 40 in contact with the inclined surface 23a of the upper side wall 23 of the glass 20 and part S of an upper surface of the top end 29a of the lip 29. The distance X is of a perpendicular line that extends between the sub seal 43 and the inclined plate 10B of the frame 10 passing through the part S of the upper surface of the top end 29a of the lip 29.

In addition, according to an aspect of the present invention, the sealing structure further includes an inner garnish 60 provided at a distance Y from an inner-cabin side of the installation base member 41 of the door weather strip 40 along the upper surface of the inner-cabin side plate 10C of the frame 10.

The length of the sub seal 43 of the door weather strip 40 is sized and dimensioned to position the part P of the lower part of the top end 43a of the sub seal 43 of the door weather strip 40 on the upper surface of the lip 29 of the glass run 20 when the door weather strip 40 partially moves toward the interior of the automobile under the downward force F applied on the sub seal 43, the installation base member 41 touches the inner garnish 60, and the sub seal 43 touches the inclined plate 10B.

In addition, according to an aspect of the present invention, the length of the sub seal 43 of the door weather strip 40 is sized and dimensioned in a manner that a distance L is longer than a sum X+Y of a distance X plus the distance Y with the glass run 20 and the door weather strip 40 coupling to the door 1. The distance L is between the part P of the lower part of the top end 43a of the sub seal 43 of the door weather strip 40 in contact with the inclined surface 23a of the upper side wall 23 of the glass run 20 and part S of an upper surface of the top end 29a of the lip 29. The distance X is of a perpendicular line that extends between the sub seal 43 and the inclined plate 10B of the frame 10 passing through the part S of the upper surface of the top end 29a of the lip 29.

In addition, according to an aspect of the present invention, a thickness of a lower side part of the base root 43b of the sub seal 43 is increased relative to the installation base member 41 of the door weather strip 40, to narrow a space between the lower side part of the base root 43b and the inclined plate 10B of the frame 10.

In addition, according to an aspect of the present invention, the length of the sub seal 43 of the door weather strip 40 is sized and dimensioned in a manner that the part P of the lower part of the top end 43a of the sub seal 43 of the door weather strip 40 in contact with the inclined surface 23a of the upper side wall 23 of the glass run 20 is lower than an upper surface of the upper side wall 23 with the glass run 20 and the door weather strip 40 coupling to the door 1.

In addition, according to an aspect of the present invention, the glass run 20 further includes a protrusion 38 which protrudes upward from the inner-cabin side end of the upper side wall 23 of the glass run 20. The protrusion 38 has an apex 38a which is an upper edge of the inclined surface 23a.

The length of the sub seal 43 of the door weather strip 40 is sized and dimensioned in a manner that the part P of the lower part of the top end 43a of the sub seal 43 of the door weather strip 40 in contact with the inclined surface 23a of the upper side wall 23 of the glass run 20 is lower than the apex 38a of the protrusion 38 with the glass run 20 and the door weather strip 40 coupling to the door 1.

Symbols in parentheses show constituents or items corresponding to the drawings.

According to the present invention, when the glass run and the door weather strip couple to the door, the top end of the lip which protrudes and extends downward toward the interior of the automobile from the upper side wall of the glass run is above the connecting part provided between the flange and the inclined plate of the frame contactlessly. In other words, this provides a space between the top end of the lip and the frame.

This prevents the lip from abutting with the flange of the frame and hampering a coupling operation of the glass run to the flange. This eliminates the need for a conventional mechanism with a rotatable lip (FIG. 10) and simplifies the coupling operation.

Figure 6:
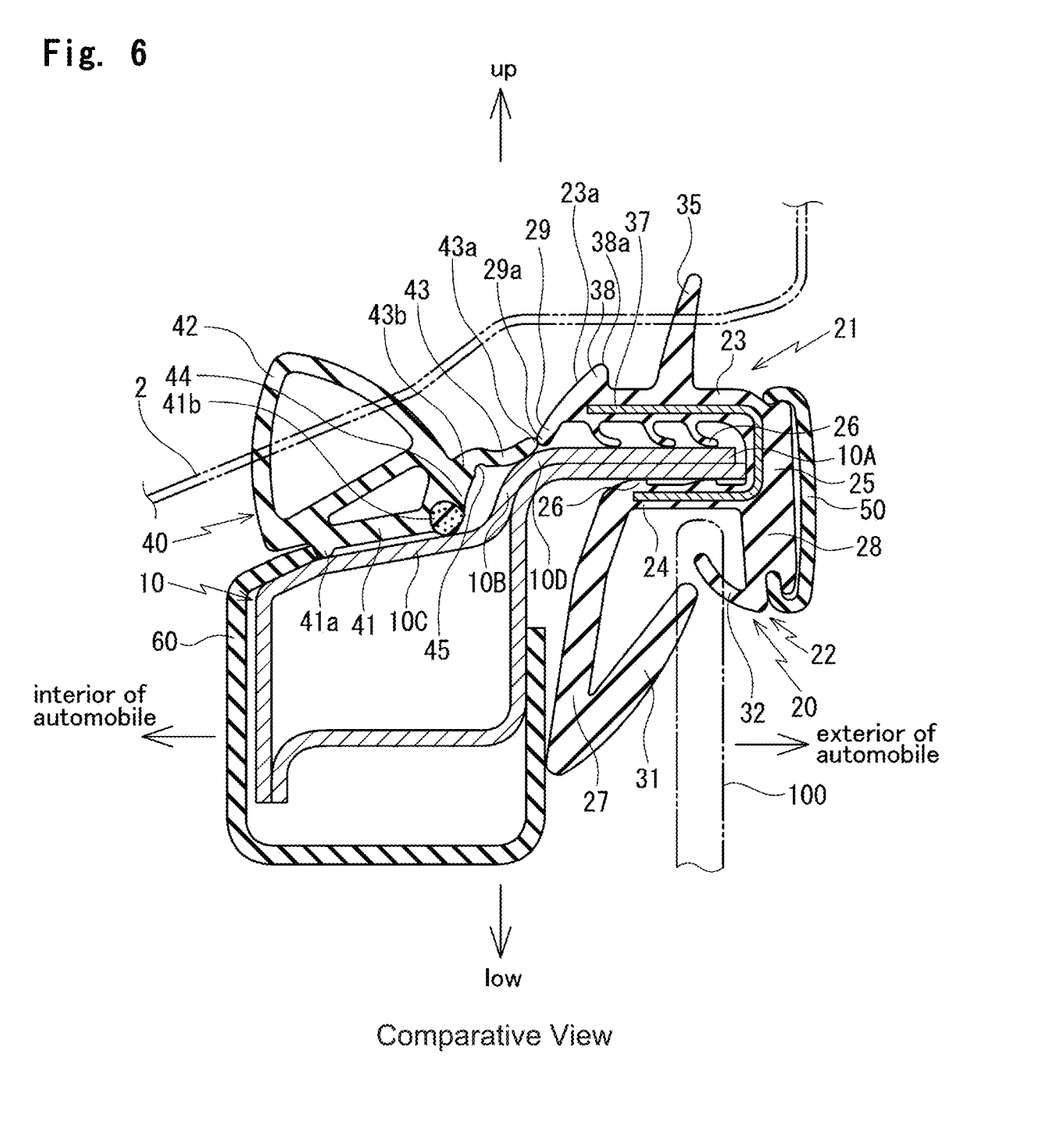
FIG. 6 is an enlarged vertical cross-sectional view of a comparative sealing structure taken along line I-I of FIG. 7 with a length of the seal lip shortened for comparison with the sealing structure according to the embodiment of the invention.

In addition, the inclined surface is provided on the inner-cabin side end of the upper side wall of the glass run and inclines downward toward the interior of the automobile from the part of the inner-cabin side end of the upper side wall. The lip of the glass run is flush with the inclined surface. When the glass run and the door weather strip couple to the door, only the lower part of the top end of the sub seal of the door weather strip makes contact with the inclined surface of the upper side wall of the glass run. Also, the length of the sub seal is sized and dimensioned to position the part of the lower part of the top end of the sub seal on the upper surface of the lip of the glass run when the sub seal touches the inclined plate of the frame under the downward force applied on the sub seal. This prevents the top end of the sub seal from colliding with, or getting stuck with, the top end of the lip as illustrated in FIG. 6.

The length of the sub seal may be sized and dimensioned in the manner that the distance L is longer than the distance X with the glass run and the door weather strip coupling to the door. The distance L is between the part of the lower part of the top end of the sub seal in contact with the inclined surface of the upper side wall of the glass run and the part of the upper surface of the top end of the lip. The distance X is of the perpendicular line that extends between the sub seal and the inclined plate of the frame passing through the part of the upper surface of the top end of the lip.

In addition, only the lower part of the top end of the sub seal of the door weather strip makes contact with the inclined surface of the upper side wall of the glass run. Accordingly, the sub seal would merely move upward along the inclined surface of the upper side wall of the glass run without buckling to spoil appearance if the length of the sub seal or a position to couple the door weather strip is uneven, in a different manner from a conventional sub seal (FIG. 10) halted and controlled by a concave part.

In addition, the sealing structure further includes the inner garnish provided on the inner-cabin side of the installation base member of the door weather strip along the upper surface of the inner-cabin side plate of the frame. The inner garnish functions as a stopper when the door weather strip moves toward the interior of the automobile, and is useful especially within a distance between two adjacent clips on the installation base member without the clip.

Also, the distance Y provided between the installation base member and the inner garnish prevents the installation base member from partially rising if the position to couple the door weather strip is slightly uneven in an inner-cabin and outer-cabin direction.

When the distance Y is provided between the installation base member and the inner garnish, the length of the sub seal may be sized and dimensioned in the manner that the distance L is longer than the sum X+Y of the distance X plus the distance Y with the glass run and the door weather strip coupling to the door. The distance L is between the part of the lower part of the top end of the sub seal in contact with the inclined surface of the upper side wall of the glass run and the part of the upper surface of the top end of the lip. The distance X is of the perpendicular line that extends between the sub seal and the inclined plate of the frame passing through the part of the upper surface of the top end of the lip.

In addition, the thickness of the lower side part of the base root of the sub seal is increased relative to the installation base member of the door weather strip, to narrow the space between the lower side part of the base root and the inclined plate of the frame. This increases rigidity of the base root of the sub seal, and stabilizes the base root of the sub seal under the downward force applied on the sub seal.

In addition, the narrower space between the sub seal and the inclined plate of the frame decreases flexible volume of the sub seal, to prevent the top end of the sub seal from getting stuck with the top end of the lip more effectively than the sub seal without the increased thickness of the lower side part of the base root.

In addition, the length of the sub seal of the door weather strip is sized and dimensioned in the manner that the part of the lower part of the top end of the sub seal in contact with the inclined surface of the upper side wall of the glass run is lower than the upper surface of the upper side wall with the glass run and the door weather strip coupling to the door. This allows determination of an appropriate length of the sub seal considering part of a circumference of the door without the glass run.

This prevents unnecessary extension of the sub seal and spoiled appearance.

In addition, the glass run further includes the protrusion which protrudes upward from the inner-cabin side end of the upper side wall of the glass run. The protrusion has the apex which is the upper edge of the inclined surface. The length of the sub seal of the door weather strip is sized and dimensioned in the manner that the part of the lower part of the top end of the sub seal in contact with the inclined surface of the upper side wall of the glass run is lower than the apex of the protrusion with the glass run and the door weather strip coupling to the door. This allows determination of the appropriate length of the sub seal considering part of the circumference of the door without the glass run.

This prevents the unnecessary extension of the sub seal and the spoiled appearance.

MODE FOR CARRYING OUT THE INVENTION

Figure 1:
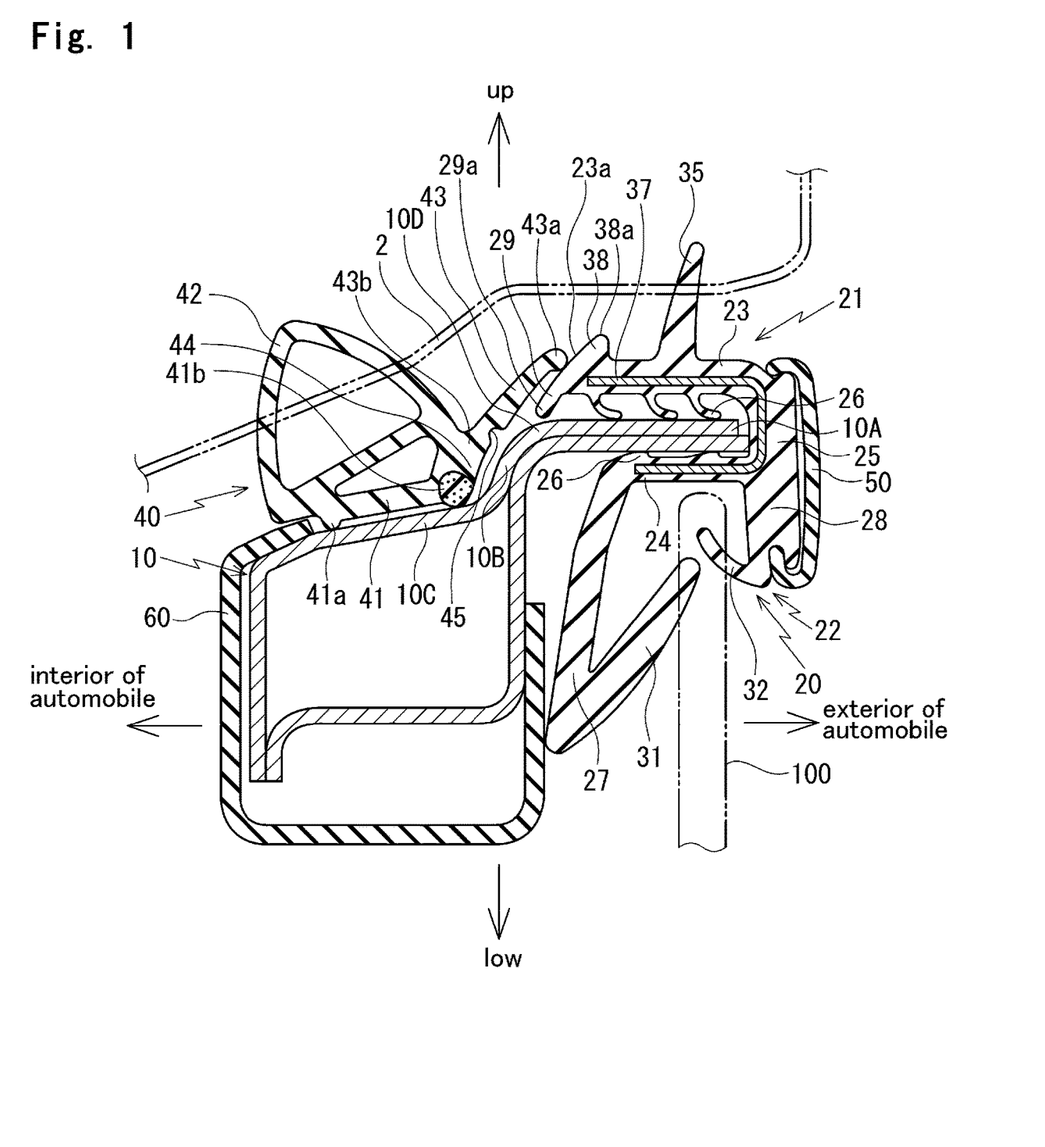
FIG. 1 is an enlarged vertical cross-sectional view of a sealing structure according to an embodiment of the invention taken along line I-I of FIG. 7 for a door of an automobile.
Figure 2:
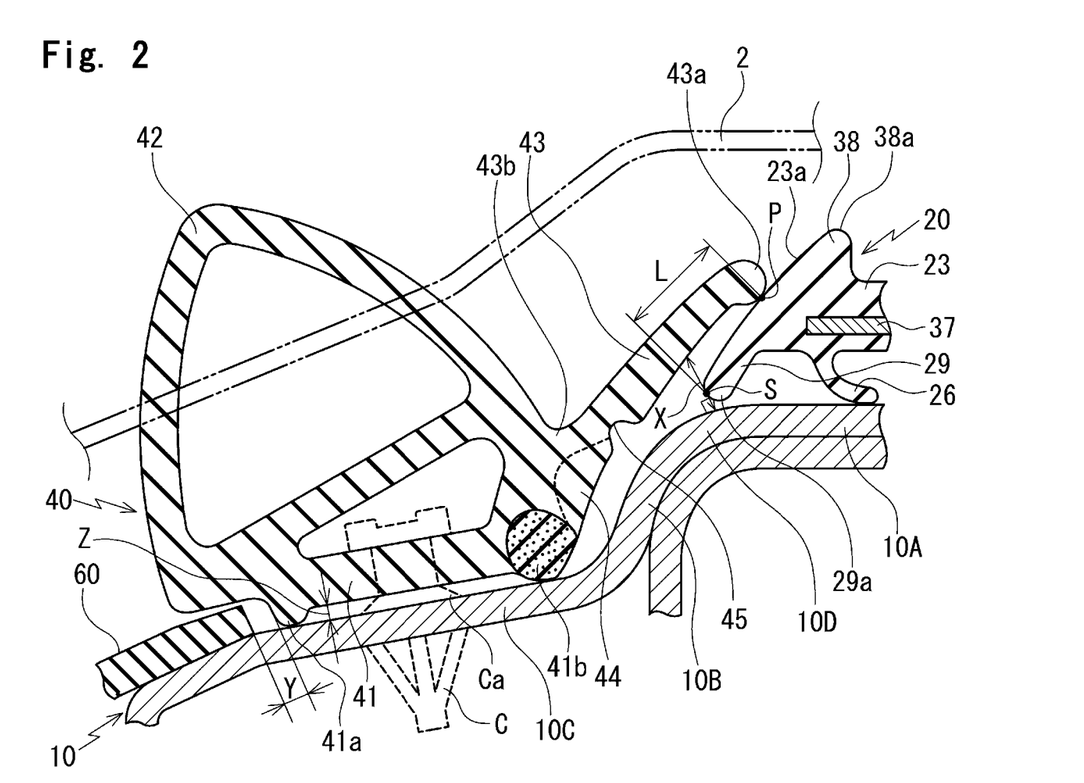
FIG. 2 is an enlarged vertical cross-sectional view showing the main components of the sealing structure shown in FIG. 1.

Referring to FIG. 1 and FIG. 2, a sealing structure according to an embodiment of the invention for a door of an automobile will be described. When constituents or items correspond to those known in the art, the same symbols are used.

As illustrated in FIG. 1 and FIG. 7, a glass run 20 couples to an outer-cabin side of a frame 10 of the automobile, and a door weather strip 40 couples to an inner-cabin side of the frame 10. A sub seal 43 of the door weather strip 40 makes contact with an upper side wall 23 of the glass run 20. The glass run 20 is of so-called "hidden type", which extends along the outer-cabin side of the frame 10, to cover up part of the frame 10 from the outer-cabin side of the frame 10.

The glass run 20 is formed by extrusion molding, and includes an installation member 21 and a main body 22. The installation member 21 couples to an outer-cabin side of a flange 10A of the frame 10. The flange 10A extends toward an exterior of the automobile. The main body 22 forms a channel to receive a door glass 100.

The installation member 21 has a substantially U-shaped cross-section, and includes an upper side wall 23, a lower side wall 24, a connecting wall 25, and an anchoring part 26. The upper side wall 23 and the lower side wall 24 extend in an inner-cabin and outer-cabin direction. The connecting wall 25 connects the upper side wall 23 and the lower side wall 24. The anchoring part 26 is provided on an inner side of the installation member 21 and makes elastic contact with the flange 10A. In this embodiment, the upper side wall 23 has three lip-shaped anchoring parts 26 on a lower surface of the upper side wall 23, and the lower side wall 24 has two protrusion-shaped anchoring parts 26 on an upper surface of the lower side wall 24.

The upper side wall 23 includes a body seal lip 35. The body seal lip 35 extends from a substantial center on an upper surface of the upper side wall 23 and makes elastic contact with a circumferential edge 2 of a door opening of an automobile body of the automobile, to seal a gap between the automobile body and the door 1. A core 37, which has a substantially U-shaped cross-section, is embedded in the installation member 21 along the upper side wall 23, the connecting wall 25, and the lower side wall 24, to increase rigidity.

A lip 29 extends downward toward an interior of the automobile from a lower part on an inner-cabin side of the upper side wall 23.

The upper side wall 23 has an inclined surface 23a, which is provided on an inner-cabin side end of the upper side wall 23 and inclines downward toward the interior of the automobile from part of the inner-cabin side end of the upper side wall 23. An upper surface of the lip 29 is flush with the inclined surface 23a, and protrudes and linearly extends downward toward the interior of the automobile. As illustrated in FIG. 1, when the glass run 20 couples to the door 1, a top end 29a of the lip 29 is opposite a connecting part 10D and is above the connecting part 10D contactlessly. The connecting part 10D is provided between the flange 10A and an inclined plate 10B, which inclines and extends downward from an inner-cabin side of the flange 10A.

The inclined surface 23a, provided on the inner-cabin side end of the upper side wall 23, has an upper edge, which corresponds to an apex 38a of a protrusion 38. The protrusion 38 protrudes upward from the upper surface of the upper side wall 23.

The main body 22 includes an inner-cabin side wall 27, an outer-cabin side wall 28, and the lower side wall 24. The inner-cabin side wall 27 extends downward from an inner-cabin side of the lower side wall 24. The outer-cabin side wall 28 extends downward from an outer-cabin side of the lower side wall 24. The lower side wall 24 connects the inner-cabin side wall 27 and the outer-cabin side wall 28 and forms the channel to receive the door glass 100.

The main body 22 includes an inner lip 31 and an outer lip 32. The inner lip 31 extends toward the exterior of the automobile from an outer-cabin side surface of an end of the inner-cabin side wall 27, and is slidably brought into contact with an inner-cabin side surface of the door glass 100. The outer lip 32 extends toward the interior of the automobile from an inner-cabin side surface of an end of the outer-cabin side wall 28 and is slidably brought into contact with an outer-cabin side surface of the door glass 100. Also, a seal lip may be provided, which extends from a lower surface of the lower side wall 24 and makes elastic contact with an end of the door glass 100.

The connecting wall 25 of the installation member 21 and the outer-cabin side wall 28 of the main body 22 are continuous in an upper-lower direction, and have a decorative molding (luminous molding, in this embodiment) 50 attached to an outer-cabin side part.

The door weather strip 40 is formed by extrusion molding, and includes an installation base member 41, a main seal 42, and a sub seal 43. The installation base member 41 is fixed on an upper surface of an inner-cabin side plate 10C of the frame 10 with clips C, which are provided at regular intervals in a longitudinal direction (front-rear direction of the automobile for an upper part of the door 1 in a closed position) of the door weather strip 40. The inner-cabin side plate 10C extends toward the interior of the automobile from a lower end of the inclined plate 10B. The main seal 42 is integrally molded with an upper side of the installation base member 41, and makes elastic contact with the circumferential edge 2 of the door opening of the automobile body of the automobile when the door 1 is in the closed position, to seal the gap between the automobile body and the door 1. The sub seal 43 is integrally molded with an outer-cabin side of the installation base member 41, and extends toward the exterior of the automobile.

The installation base member 41 is provided at a distance from an inner garnish 60, which is closer to the interior of the automobile than the installation base member 41, along the upper surface of the inner-cabin side plate 10C of the frame 10.

The installation base member 41 has an inner-cabin protrusion 41a provided on an inner-cabin side part and an outer-cabin protrusion 41b provided on an outer-cabin side part. The inner-cabin protrusion 41a and the outer-cabin protrusion 41b protrude toward the inner-cabin side plate 10C, to provide a space Z (between the upper surface of the inner-cabin side plate 10C and a lower surface of the installation base member 41). The space Z is used to insert an umbrella part Ca of the clip C, which fixes the installation base member 41 on the inner-cabin side plate 10C.

In this embodiment, the outer-cabin protrusion 41b is formed by a super-soft material that is softer than at least one other part of the installation base member 41 to improve water cut off function. The super-soft material has a specific gravity that falls within a range of 0.05 to 0.4, of which examples include foamed sponge rubber of EPDM. Alternatively, the outer-cabin protrusion 41b may be formed by the same material as at least one other part of the installation base member 41.

The main seal 42 is hollow, and makes elastic contact with the circumferential edge 2 of the door opening of the automobile body of the automobile simultaneously with the body seal lip 35 of the glass run 20.

The sub seal 43 has a shape of a lip. As illustrated in FIG. 1, when the door weather strip 40 couples to the door 1, only a lower part of the top end 43a of the sub seal 43, or a point (part P) of the lower part of the top end 43a of the sub seal 43, makes contact with the inclined surface 23a of the upper side wall 23 of the glass run 20. The lower part of the top end 43a of the sub seal 43 protrudes downward from the top end 43a of the sub seal 43.

The sub seal 43 protrudes toward the exterior of the automobile from a lower edge on an outer-cabin side of the installation base member 41 of the door weather strip 40. In this embodiment, the sub seal 43 protrudes from a position at an upward distance from a lower edge of the outer-cabin protrusion 41b in contact with the inner-cabin side plate 10C. A thickness of a lower side part of a base root 43b of the sub seal 43 is increased, to narrow a space between the lower side part of the base root 43b and the inclined plate 10B. In other words, a thick part 44 is provided between the lower edge on the outer-cabin side of the installation base member 41 and the lower side part of the base root 43b of the sub seal 43. In this embodiment the thick part 44 is formed by a material different from the outer-cabin protrusion 41b, which is formed by the soft material, but may be formed by the same material partially.

Figure 3:
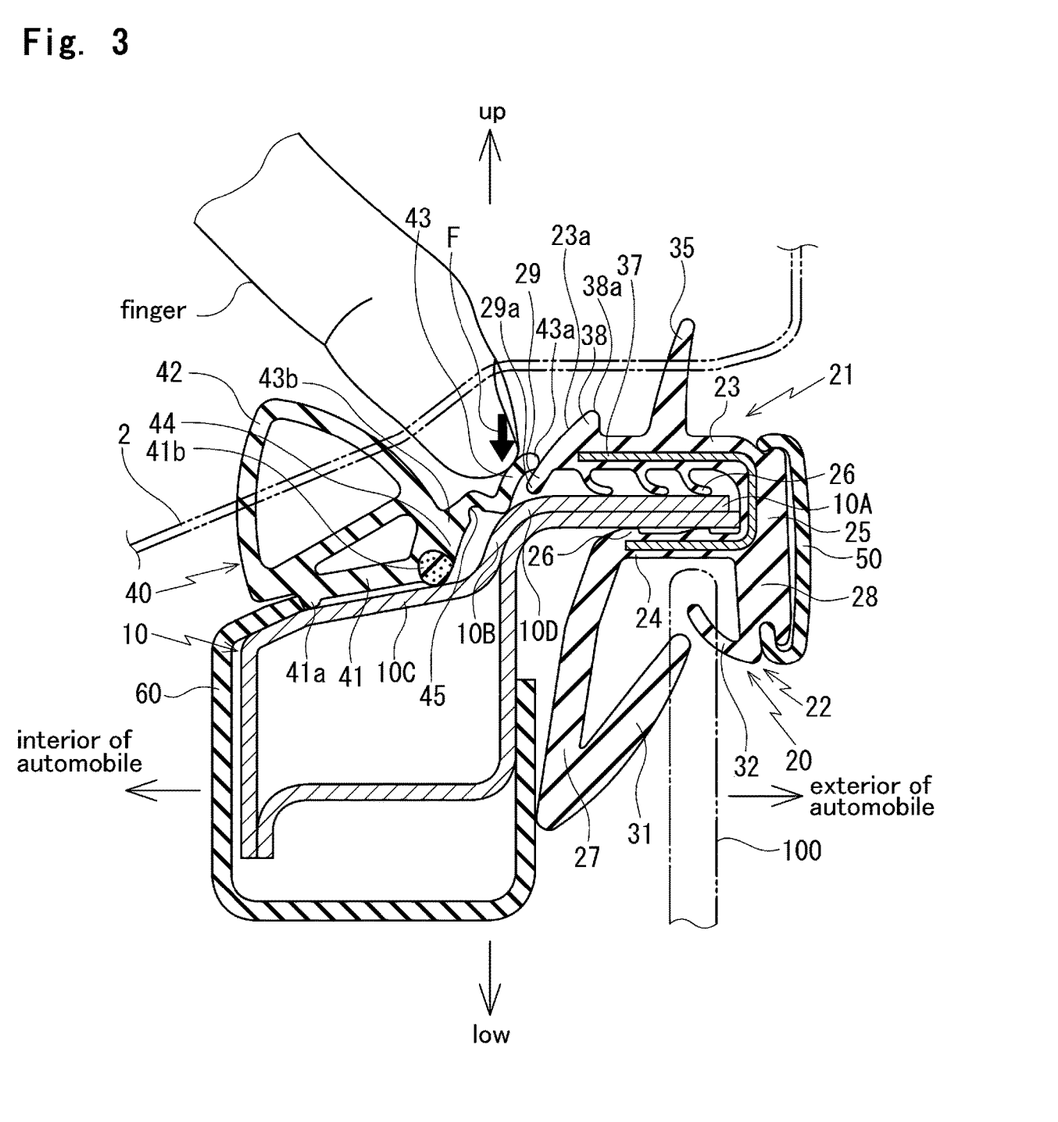
FIG. 3 is an enlarged vertical cross-sectional view of the sealing structure shown in FIG. 1 with downward force F applied on a sub seal.

As illustrated in FIG. 3, a length of the sub seal 43 toward the exterior of the automobile is sized and dimensioned to position and keep the part P of the lower part of the top end 43a of the sub seal 43 on the upper surface of the lip 29 of the glass run 20 when the sub seal 43 touches the inclined plate 10B under the downward force F applied on the sub seal 43. The downward force F can generate with operators' hands in a coupling operation of the door weather strip 40 or with users' hands in cleaning.

More specifically, as illustrated in FIG. 2, the length of the sub seal 43 is sized and dimensioned in a manner that a distance L is longer than a sum X+Y of a distance X plus a distance Y with the glass run 20 and the door weather strip 40 coupling to the door 1. The distance L is between the part P of the lower part of the top end 43a of the sub seal 43 of the door weather strip 40 in contact with the inclined surface 23a of the upper side wall 23 of the glass run 20 and part S of an upper surface of the top end 29a of the lip 29. The distance X is of a perpendicular line that extends between the sub seal 43 and the inclined plate 10B of the frame 10 passing through the part S of the upper surface of the top end 29a of the lip 29. The distance Y is between the inner garnish 60 and an inner-cabin side end of the installation base member 41, that is an inner-cabin side surface of the inner-cabin protrusion 41a of the installation base member 41. The part S of the upper surface of the top end 29a of the lip 29 is where an upper side of the top end 29a begins to form a curved surface. In other words, the part S is where a flush part of the upper surface of the lip 29, which is flush with the inclined surface 23a of the upper side wall 23 and linearly protrudes downward toward the interior of the automobile, changes into a non-flush part.

The distance Y between the installation base member 41 and the inner garnish 60 is added to the distance X considering possible misalignment of the installation base member 41 toward the interior of the automobile. The installation base member 41 of the door weather strip 40 is fixed on the inner-cabin side plate 10C with the clips C provided at regular intervals, and part of the installation base member 41 without the clip C (between two adjacent clips) can move till the part abuts with the inner garnish 60 under the downward force F applied on the sub seal 43. FIG. 3 shows the installation base member 41 of the door weather strip 40 that has moved toward the interior of the automobile and is abutted with the inner garnish 60 under the downward force F.

This prevents the top end 43a of the sub seal 43 from colliding with, or getting stuck with, the top end 29a of the lip 29 of the glass run 20 as illustrated in FIG. 6 due to the shorter length of the sub seal 43 when the sub seal 43 touches the inclined plate 10B of the frame 10 under the downward force F applied on the sub seal 43. In other words, the sub seal 43, which is loaded onto, or overlaps, the lip 29, would not come off the lip 29, or the part P of the top end 43a of the sub seal 43 would not move downward toward the interior of the automobile from the part S of the upper surface of the top end 29a of the lip 29.

The sub seal 43, once stuck with the top end 29a, is hard to return to the former state automatically, debases sealing function, and spoils appearance.

Increasing the length of the sub seal 43 prevents the top end 43a of the sub seal 43 from colliding with, or getting stuck with, the top end 29a of the lip 29 of the glass run 20 as illustrated in FIG. 6 under the downward force F applied on the sub seal 43. Overly increasing the length of the sub seal 43, however, spoils appearance.

Figure 4:
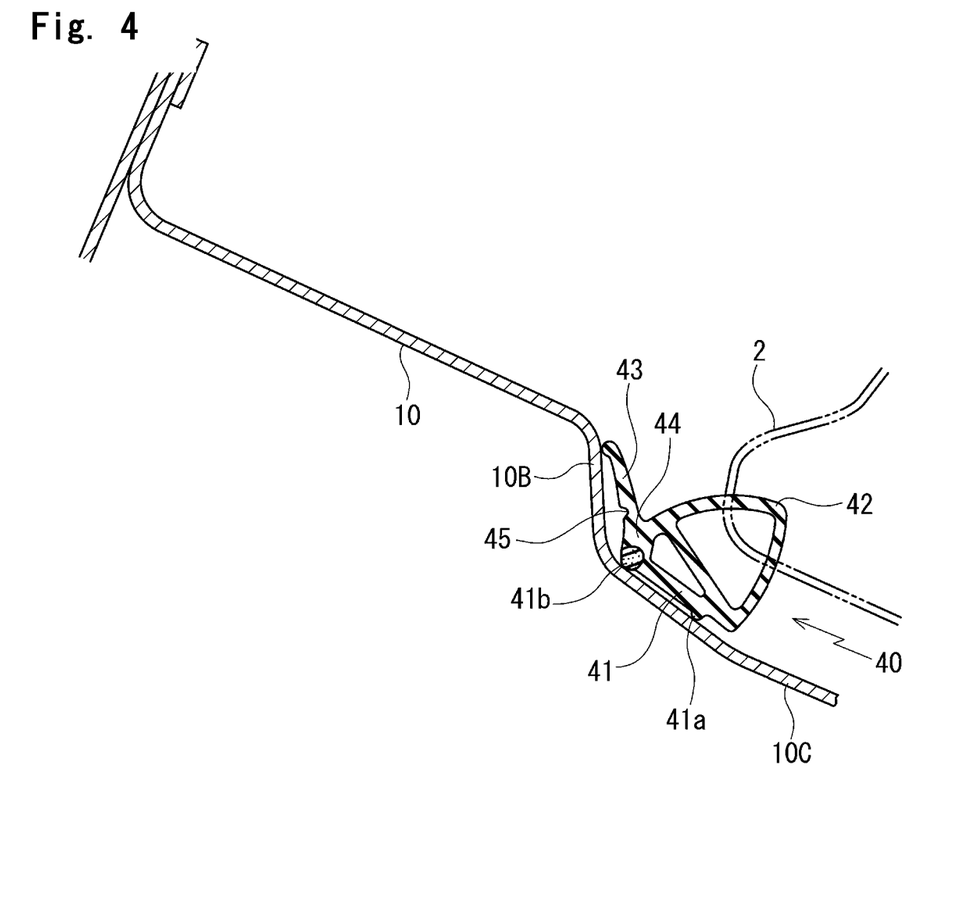
FIG. 4 is an enlarged vertical cross-sectional view of the sealing structure according to the embodiment of the invention taken along line IV-IV of FIG. 7.

Also, the top end 43a of the sub seal 43 overly increased in length can rise from the inclined plate 10B on part of the door 1 without the glass run 20, a bottom part of the door 1, for example, where the top end 43a of the sub seal 43 makes elastic contact with the inclined plate 10B directly as illustrated in FIG. 4, which is a cross-sectional view along line IV-IV in FIG. 7 illustrating a portion at the lower part of the door 1 where there is no glass run 20. Also, the sub seal 43 can bend or the door weather strip 40 can be misaligned toward the interior of the automobile when the top end 43a is forcibly brought into elastic contact with the inclined plate 10B. This lowers the sealing function.

In other words, the sub seal 43 has an appropriate length. In this embodiment, as illustrated in FIG. 2, the length of the sub seal 43 is sized and dimensioned in a manner that the lower part of the top end 43a of the sub seal 43 in contact with the inclined surface 23a of the upper side wall 23 of the glass run 20 is lower than the upper surface of the upper side wall 23 with the glass run 20 and the door weather strip 40 coupling to the door 1.

Also, a notch 45, which has a concave shape, is provided on a lower surface of the base root 43b of the sub seal 43, that is an outer-cabin side of the thick part 44, to reduce a thickness of the sub seal 43 partially. This allows the sub seal 43 to bend easily and controls a direction in which the sub seal 43 bends.

In the sealing structure according to the embodiment of the present invention for the door of the automobile, when the glass run 20 and the door weather strip 40 couple to the door 1, the top end 29a of the lip 29 of the glass run 20 is above the connecting part 10D provided between the flange 10A and the inclined plate 10B of the frame 10 contactlessly, that is with a space between the top end 29a and the frame 10. This simplifies the coupling operation of the glass run 20 to the flange 10A without the need for a complicated mechanism.

In addition, when the glass run 20 and the door weather strip 40 couple to the door 1, only the lower part of the top end 43a of the sub seal 43 makes contact with the inclined surface 23a of the upper side wall 23 of the glass run 20. Also, the length of the sub seal 43 is sized and dimensioned to position the lower part of the top end 43a of the sub seal 43 on the upper surface of the lip 29 of the glass run 20 when the sub seal 43 touches the inclined plate 10B under the downward force F applied on the sub seal 43. This prevents the top end 43a of the sub seal 43 from colliding with, or getting stuck with, the top end 29a of the lip 29 as illustrated in FIG. 6. Also, this prevents the worst case that the top end 43a of the sub seal 43 enters a space between the top end 29a of the lip 29 and the frame 10.

In addition, only the lower part of the top end 43a of the sub seal 43 makes contact with the inclined surface 23a of the upper side wall 23 of the glass run 20. Accordingly, the sub seal 43 would merely move upward along the inclined surface 23a of the upper side wall 23 of the glass run 20 if the length of the sub seal 43 or a position to couple the door weather strip 40 is uneven.

This is different from a conventional structure that halts and controls the sub seal 43, and prevents the sub seal 43 from buckling, that is rising upward or downward, to spoil appearance.

In addition, the sealing structure further includes the inner garnish 60 provided on the inner-cabin side of the installation base member 41 of the door weather strip 40 along the upper surface of the inner-cabin side plate 10C of the frame 10. The inner garnish 60 functions as a stopper when the door weather strip 40 moves toward the interior of the automobile, and is useful especially within a distance between two adjacent clips C on the installation base member 40 without the clip C.

Also, the distance Y provided between the installation base member 41 and the inner garnish 60 prevents the installation base member 41 from partially rising if the position to couple the door weather strip 40 is slightly uneven in the inner-cabin and outer-cabin direction.

In addition, the thickness of the lower side part of the base root 43b of the sub seal 43 is increased relative to the installation base member 41 of the door weather strip 40, to narrow the space between the lower side part of the base root 43b and the inclined plate 10B of the frame 10. This increases rigidity of the base root 43b of the sub seal 43, and stabilizes the base root 43b of the sub seal 43 under the downward force F applied on the sub seal 43.

In addition, the narrower space between the sub seal 43 and the inclined plate 10B of the frame 10 decreases flexible volume of the sub seal 43, to prevent the top end 43a of the sub seal 43 from getting stuck with the top end 29a of the lip 29 more effectively than the sub seal 43 without the increased thickness of the lower side part of the base root 43b.

Figure 5:
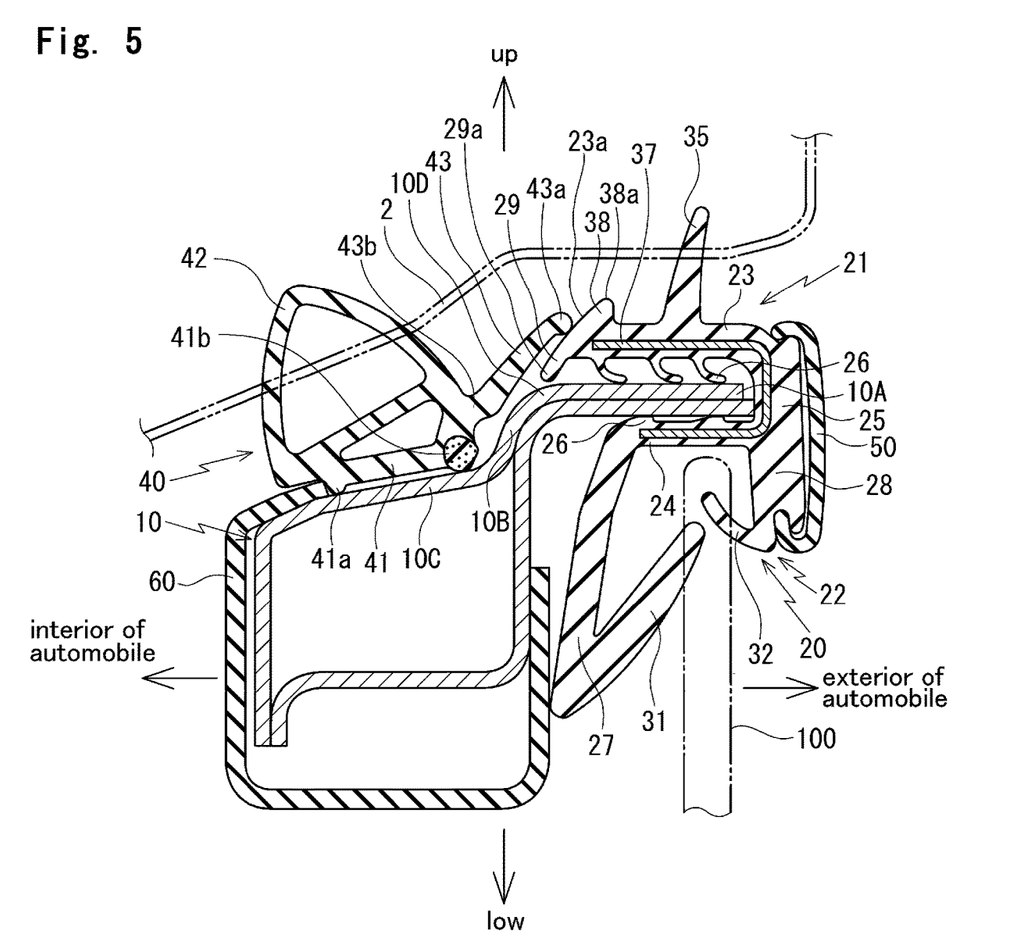
FIG. 5 is an enlarged vertical cross-sectional view of a sealing structure according to another embodiment of the invention taken along line I-I of FIG. 7 for a door of an automobile.

In this embodiment, the notch 45 as well as the thick part 44 is provided on part of the sub seal 43 closer to the base root 43b. Alternatively, the notch 45 and the thick part 44 may be omitted as illustrated in FIG. 5. Alternatively, at least one of the notch 45 or the thick part 44 may be provided.

Alternatively, when the glass run 20 and the door weather strip 40 couple to the door 1, the installation base member 41 may abut with the inner garnish 60 without the distance Y between the installation base member 41 and the inner garnish 60, that is the distance Y=0, as illustrated in FIG. 5.

In this modification, the length of the sub seal 43 is to be sized and dimensioned to position the part P away from the part S when the sub seal 43 touches the inclined plate 10B under the downward force F applied on the sub seal 43, to prevent the top end 43a of the sub seal 43 from getting stuck with the top end 29a of the lip 29. The part P is on the lower part of the top end 43a of the sub seal 43. The part S is on the upper surface of the lip 29 of the glass run 20.

In this embodiment, as illustrated in FIG. 2, the length of the sub seal 43 is sized and dimensioned in the manner that the distance L is longer than the sum X+Y of the distance X plus the distance Y with the glass run 20 and the door weather strip 40 coupling to the door 1. The distance L is between the part P of the lower part of the top end 43a of the sub seal 43 of the door weather strip 40 in contact with the inclined surface 23a of the upper side wall 23 of the glass run 20 and the part S of the upper surface of the top end 29a of the lip 29. The distance X is of the perpendicular line that extends between the sub seal 43 and the inclined plate 10B of the frame 10 passing through the part S. The distance Y is between the inner garnish 60 and the inner-cabin side end of the installation base member 41, that is the inner-cabin side surface of the inner-cabin protrusion 41a of the installation base member 41. Alternatively, the distance L may be longer than a sum X+Y+Z including the space Z, provided between the upper surface of the inner-cabin side plate 10C and the lower surface of the installation base member 41.

In this modification, the space Z between the upper surface of the inner-cabin side plate 10C and the lower surface of the installation base member 41 is added to the sum X+Y as the possible maximum value by which the outer-cabin protrusion 41b moves downward under the downward force F when the outer-cabin protrusion 41b is formed by the super soft material. The length of the sub seal 43 is to be sized and dimensioned considering the space Z.

The invention claimed is:

1. A sealing structure for a door of an automobile, the sealing structure comprising:

a glass run, for guiding a door glass in a frame of the door, the frame including a flange which extends toward an exterior of the automobile, an inclined plate which inclines and extends downward from an inner-cabin side of the flange, an inner-cabin side plate which extends toward an interior of the automobile from a lower end of the inclined plate, and a connecting part provided between the flange and the inclined plate, and the glass run comprising:

an installation member operably couplable to an outer-cabin side of the flange, the installation member having a substantially U-shaped cross-section including an upper side wall, a lower side wall, a connecting wall which connects the upper side wall and the lower side wall, an anchoring part provided on an inner side of the installation member, and an inclined surface which is provided on an inner-cabin side end of the upper side wall and inclines downward toward the interior of the automobile from part of the inner-cabin side end of the upper side wall;

a main body including an inner-cabin side wall which extends downward from an inner-cabin side of the lower side wall, an outer-cabin side wall which extends downward from an outer-cabin side of the lower side wall, and the lower side wall which connects the inner-cabin side wall and the outer-cabin side wall and forms a channel; and a lip which protrudes and extends downward toward the interior of the automobile from a lower part on an inner-cabin side of the upper side wall, the lip having a top end, and the lip being flush with the inclined surface; and a door weather strip comprising:

an installation base member operably couplable to an upper surface of the inner-cabin side plate of the frame with clips;

a main seal integrally molded with an upper side of the installation base member, and the main seal being configured to make contact with a body of the automobile when the door is in a closed position; and a sub seal integrally molded with an outer-cabin side of the installation base member, the sub seal extending toward the exterior of the automobile, the sub seal having a shape of a lip, the sub seal having a top end and a base root, and the sub seal being configured to make contact with the upper side wall of the glass run;

wherein:

when the glass run and the door weather strip couple to the door, the top end of the lip is above the connecting part of the frame contactlessly, only a lower part of the top end of the sub seal of the door weather strip makes contact with the inclined surface of the upper side wall of the glass run, and a length of the sub seal of the door weather strip is sized and dimensioned to position part of the lower part of the top end of the sub seal on an upper surface of the lip of the glass run when the sub seal touches the inclined plate of the frame under a downward force applied on the sub seal.

2. The sealing structure as claimed in claim 1, wherein the length of the sub seal of the door weather strip is sized and dimensioned in a manner that a first distance is longer than a second distance with the glass run and the door weather strip coupling to the door, where the first distance is between the part of the lower part of the top end of the sub seal of the door weather strip in contact with the inclined surface of the upper side wall of the glass run and part of an upper surface of the top end of the lip, and the second distance is of a perpendicular line that extends between the sub seal and the inclined plate of the frame passing through the part of the upper surface of the top end of the lip.

3. The sealing structure as claimed in claim 1, wherein
the sealing structure further includes an inner garnish provided at a garnish distance from an inner-cabin side of the installation base member of the door weather strip along the upper surface of the inner-cabin side plate of the frame, and the length of the sub seal of the door weather strip is sized and dimensioned to position the part of the lower part of the top end of the sub seal of the door weather strip on the upper surface of the lip of the glass run when the door weather strip partially moves toward the interior of the automobile under the downward force applied on the sub seal, the installation base member touches the inner garnish, and the sub seal touches the inclined plate.

4. The sealing structure as claimed in claim 3, wherein the length of the sub seal of the door weather strip is sized and dimensioned in a manner that a first distance is longer than a sum of a second distance plus the garnish distance with the glass run and the door weather strip coupling to the door, where the first distance is between the part of the lower part of the top end of the sub seal of the door weather strip in contact with the inclined surface of the upper side wall of the glass run and part of an upper surface of the top end of the lip, and the second distance is of a perpendicular line that extends between the sub seal and the inclined plate of the frame passing through the part of the upper surface of the top end of the lip.

5. The sealing structure as claimed in claim 1, wherein
a thickness of a lower side part of the base root of the sub seal is increased relative to the installation base member of the door weather strip, to narrow a space between the lower side part of the base root and the inclined plate of the frame.

6. The sealing structure as claimed in claim 1, wherein the length of the sub seal of the door weather strip is sized and dimensioned in a manner that the part of the lower part of the top end of the sub seal of the door weather strip in contact with the inclined surface of the upper side wall of the glass run is lower than an upper surface of the upper side wall with the glass run and the door weather strip coupling to the door.

7. The sealing structure as claimed in claim 1, wherein:
the glass run further includes a protrusion which protrudes upward from the inner-cabin side end of the upper side wall of the glass run, the protrusion has an apex which is an upper edge of the inclined surface, and the length of the sub seal of the door weather strip is sized and dimensioned in a manner that the part of the lower part of the top end of the sub seal of the door weather strip in contact with the inclined surface of the upper side wall of the glass run is lower than the apex of the protrusion with the glass run and the door weather strip coupling to the door.

* * * * *